United States Patent
Kwon et al.

(10) Patent No.: US 11,458,817 B2
(45) Date of Patent: Oct. 4, 2022

(54) AIR CONDITIONING SYSTEM HAVING A HYBRID FILTER

(71) Applicants: HYUNDAI MOTOR COMPANY, Seoul (KR); KIA MOTORS CORPORATION, Seoul (KR); Hanon Systems, Daejeon (KR)

(72) Inventors: Dong Ho Kwon, Yongin-si (KR); Dae Ig Jung, Suwon-si (KR); Gee Young Shin, Suwon-si (KR); Seung Hyeok Chang, Suwon-si (KR); Seong Seok Han, Daejeon (KR); Soo Byeong Nam, Daejeon (KR); Jae Kyun Kim, Daejeon (KR)

(73) Assignees: HYUNDAI MOTOR COMPANY, Seoul (KR); KIA MOTORS CORPORATION, Seoul (KR); Hanon Systems, Daejeon (KR)

( * ) Notice: Subject to any disclaimer, the term of this patent is extended or adjusted under 35 U.S.C. 154(b) by 223 days.

(21) Appl. No.: 16/824,330

(22) Filed: Mar. 19, 2020

(65) Prior Publication Data
US 2021/0114437 A1 Apr. 22, 2021

(30) Foreign Application Priority Data
Oct. 16, 2019 (KR) .................. 10-2019-0128354

(51) Int. Cl.
*B60H 1/00* (2006.01)
*B60H 3/06* (2006.01)
*B60H 1/26* (2006.01)

(52) U.S. Cl.
CPC ....... *B60H 3/0641* (2013.01); *B60H 1/00021* (2013.01); *B60H 1/00835* (2013.01); *B60H 1/26* (2013.01); *B60H 2001/0015* (2013.01)

(58) Field of Classification Search
CPC ...... B60H 3/0641; B60H 3/06; B60H 3/0608; B60H 1/00835; F24F 1/035; F24F 3/16; F24F 8/10; F24F 13/085
USPC ......................................... 454/158, 75, 143
See application file for complete search history.

(56) References Cited

U.S. PATENT DOCUMENTS

| | | | | |
|---|---|---|---|---|
| 5,540,617 A * | 7/1996 | Siegel | ...................... | B60H 3/06 454/158 |
| 5,876,277 A * | 3/1999 | Uemura | ............. | B60H 1/00849 454/139 |
| 8,002,615 B2 * | 8/2011 | Jeong | ................. | B60H 1/00849 454/139 |
| 8,939,823 B2 * | 1/2015 | Kanemaru | ......... | B60H 1/00678 454/139 |
| 2009/0042502 A1 * | 2/2009 | Kim | .................... | B60H 3/0071 454/139 |
| 2015/0024669 A1 * | 1/2015 | Gesell | ...................... | B60H 1/24 454/75 |

(Continued)

FOREIGN PATENT DOCUMENTS

KR 100693549 B1 3/2007

*Primary Examiner* — Ko-Wei Lin
(74) *Attorney, Agent, or Firm* — Lempia Summerfield Katz LLC

(57) ABSTRACT

An air conditioning system provides inside air conditioning and performs the function of cleaning the inside air, so that the inside air is maintained to be pleasant. The air cleaning time of cleaning the inside air is decreased, so the possibility of moisture generated on an inside window due to the air cleaning is reduced.

17 Claims, 6 Drawing Sheets

(56) References Cited

U.S. PATENT DOCUMENTS

| | | | | |
|---|---|---|---|---|
| 2019/0092143 A1* | 3/2019 | Kakizaki | ............... | B60H 3/024 |
| 2020/0376934 A1* | 12/2020 | Mazzocco | .......... | B01D 46/0023 |
| 2021/0146752 A1* | 5/2021 | Lee | ..................... | B60H 3/0608 |
| 2021/0276401 A1* | 9/2021 | Stiehler | ............. | B01D 46/0036 |

* cited by examiner

AIR CONDITIONING SYSTEM HAVING A HYBRID FILTER

CROSS REFERENCE TO RELATED APPLICATION

The present application claims priority to Korean Patent Application No. 10-2019-0128354, filed Oct. 16, 2019, the entire contents of which is incorporated herein for all purposes by this reference.

BACKGROUND OF THE DISCLOSURE

Field of the Disclosure

The present disclosure relates to an air conditioning system having a hybrid filter which provides air conditioning and performs an air cleaning function.

Description of the Related Art

Generally, a vehicle is equipped with an air conditioning system having a heating and cooling system to provide cool air or warm air. Such an air conditioning system can selectively control whether to perform an outside air circulation mode allowing outside air to be introduced to the inside of a vehicle, or whether to perform an inside air circulation mode allowing air of the inside to be circulated.

Recently, atmospheric air may be polluted by particulate matter and yellow dust. The particulate matter may be introduced to the inside of a vehicle, causing air inside the vehicle to become polluted. Accordingly, an air cleaner is installed inside a vehicle. However, an installation space for the air cleaner is required to be secured in the vehicle and the air cleaning effect of the air cleaner is also insufficient.

Also, in the case of applying a filter that increases the rate of filtering particulate matter in the air conditioning system, manufacturing cost is increased. On the other hand, when the rate of filtering particulate matter is high, air does not flow efficiently, so the efficient supply of air-conditioned air is reduced or prevented.

The foregoing is intended merely to aid in understanding the background of the present disclosure, and is not intended to mean that the present disclosure falls within the purview of the related art that is already known to those having ordinary skill in the art.

SUMMARY OF THE DISCLOSURE

Accordingly, the present disclosure has been made keeping in mind the above problems occurring in the related art. The present disclosure is intended to propose an air conditioning system having a hybrid filter, which provides inside air conditioning and performs an inside air cleaning function such that the inside air is maintained to be pleasant.

In order to achieve the above object, according to one aspect of the present disclosure, there is provided an air conditioning system having a hybrid filter. The system includes: an air conditioning housing having an outside air inlet through which outside air flows; an inside air inlet through which inside air flows; and an inside/outside air door being configured to control opening ratios of the outside air inlet and the inside air inlet. The system also includes an air filter provided to filter foreign materials from the air flowing through the outside air inlet and the inside air inlet in the air conditioning housing. The air filter is divided into a low collection area and a high collection area. The system also includes a filter door arranged between the outside air inlet and the inside air inlet and the air filter. The filter door controls a flow amount of the air flowing through the low collection area and the high collection area of the air filter.

The air filter may be configured such that a foreign material collection rate of the high collection area is higher than a foreign material collection rate of the low collection area.

The filter door may include a first door disposed to correspond to the low collection area and configured to control the flow amount of air flowing to the low collection area. The filter door may include a second door disposed to correspond to the high collection area and configured to control the flow amount of air flowing to the high collection area.

A first door and a second door may be composed of a plurality of flaps arranged linearly between the outside air inlet and the inside air inlet and the air filter. A rotation angle of each of the flaps corresponding to the first door and the flaps corresponding to the second door may be changed by operation of an actuator. Thus, the flow amount of the air flowing to the air filter may be controlled.

The system may further include a controller performing control of opening and closing the inside/outside air door and the first door and the second door of the filter door by selecting a cooling or heating mode. The cooling or heating mode is selected according to an inside temperature and an inside/outside particulate matter concentration after collecting the inside temperature and information on the inside/outside particulate matter concentration.

When the inside temperature reaches a required temperature and the inside particulate matter concentration is lower than a reference particulate matter concentration, the controller in the cooling mode may perform control of allowing the inside/outside air door to open the inside air inlet, of opening the first door, and of closing the second door.

When the inside temperature reaches a required temperature and the inside particulate matter concentration is higher than a reference particulate matter concentration, the controller in the cooling mode may perform control of allowing the inside/outside air door to open the inside air inlet, of closing the first door, and of opening the second door.

When the inside temperature does not reach a required temperature and the inside particulate matter concentration is lower than a reference particulate matter concentration, the controller in the cooling mode may perform control of allowing the inside/outside air door to open the inside air inlet and of opening the first door and the second door.

When the inside temperature does not reach a required temperature and the inside particulate matter concentration is higher than a reference particulate matter concentration, the controller in the cooling mode may perform the control of allowing the inside/outside air door to open the inside air inlet and of opening the first door and the second door.

When the inside particulate matter concentration is higher than a limit particulate matter concentration that is set to be higher than the reference particulate matter concentration, the controller may perform control of partially opening the first door and of completely opening the second door.

When the inside temperature reaches a required temperature and the outside particulate matter concentration is lower than a set particulate matter concentration, the controller in the heating mode may perform control of allowing the inside/outside air door to open the outside air inlet, of opening the first door, and of closing the second door.

When the inside temperature reaches a required temperature and the outside particulate matter concentration is higher than a set particulate matter concentration, the controller in the heating mode may perform control of allowing the inside/outside air door to open the outside air inlet, of closing the first door, and of opening the second door.

When the inside temperature reaches a required temperature, the inside particulate matter concentration is higher than a reference particulate matter concentration, and the outside particulate matter concentration is lower than a set particulate matter concentration, the controller in the heating mode may perform the control of allowing the inside/outside air door to open the outside air inlet, of closing the first door, and of opening the second door.

When the inside particulate matter concentration is higher than a limit particulate matter concentration that is set to be higher than the reference particulate matter concentration, the controller may perform the control of allowing the inside/outside air door to open the inside air inlet, of closing the first door, and of opening the second door.

When the inside temperature does not reach a required temperature and the outside particulate matter concentration is higher than a set particulate matter concentration, the controller in the heating mode may perform control of allowing the inside/outside air door to open the outside air inlet and of opening the first door and the second door.

When the inside temperature does not reach a required temperature, the inside particulate matter concentration is higher than a reference particulate matter concentration, and the outside particulate matter concentration is lower than a set particulate matter concentration, the controller in the heating mode may perform the control of allowing the inside/outside air door to open the outside air inlet and of opening the first door and the second door.

When the inside particulate matter concentration is higher than a limit particulate matter concentration that is set to be higher than the reference particulate matter concentration, the controller may perform the control of allowing the inside/outside air door to open the inside air inlet, of partially opening the first door, and of completely opening the second door.

The air conditioning system provided with a hybrid filter having the above-described structure provides inside air conditioning and performs the air cleaning function of inside air, thereby keeping the inside air pleasant. In addition, the air cleaning time of the inside air is decreased, so the possibility of moisture generated on an inside window surface due to the air cleaning is reduced.

BRIEF DESCRIPTION OF THE DRAWINGS

The above and other objects, features, and other advantages of the present disclosure should be more clearly understood from the following detailed description when taken in conjunction with the accompanying drawings, in which.

DETAILED DESCRIPTION OF THE DISCLOSURE

Hereinbelow, an air conditioning system having a hybrid filter according to an embodiment of the present disclosure is described with reference to the accompanying drawings.

Figure 1:
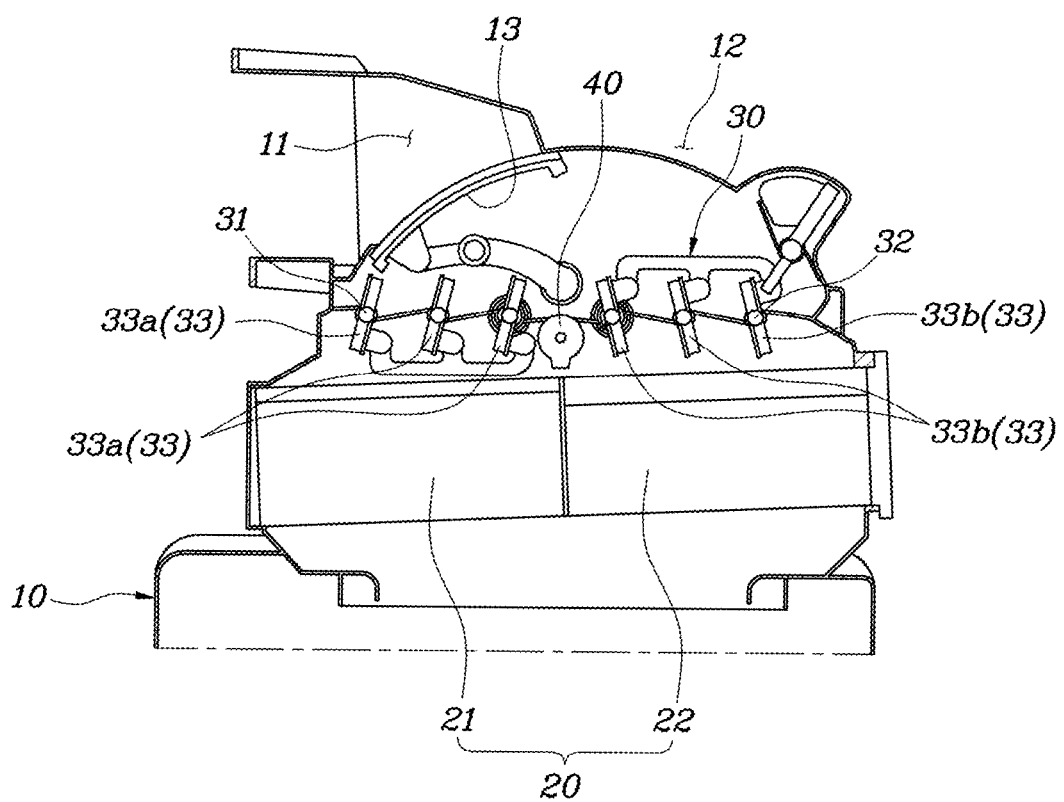
FIG. 1 is a view illustrating an air conditioning system having a hybrid filter according to the present disclosure.
Figure 2:
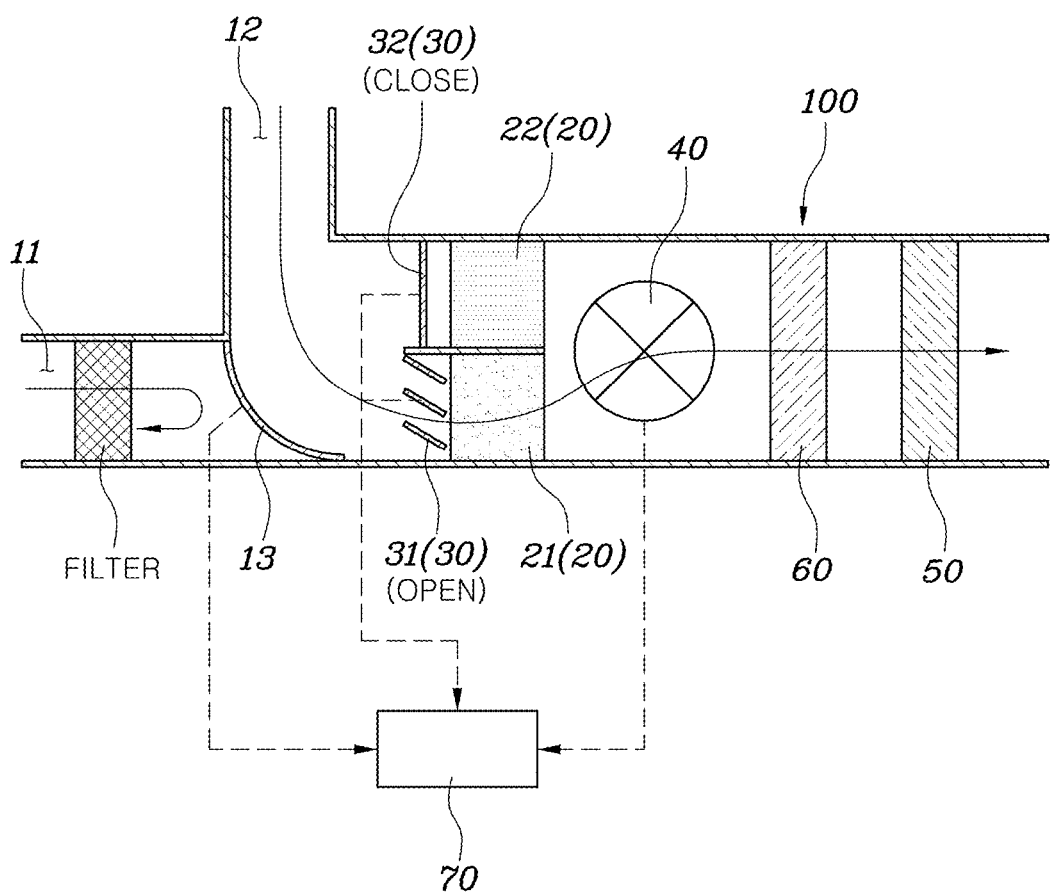
FIG. 2 is a view illustrating the configuration of the air conditioning system having a hybrid filter illustrated in FIG. 1.
Figure 3:
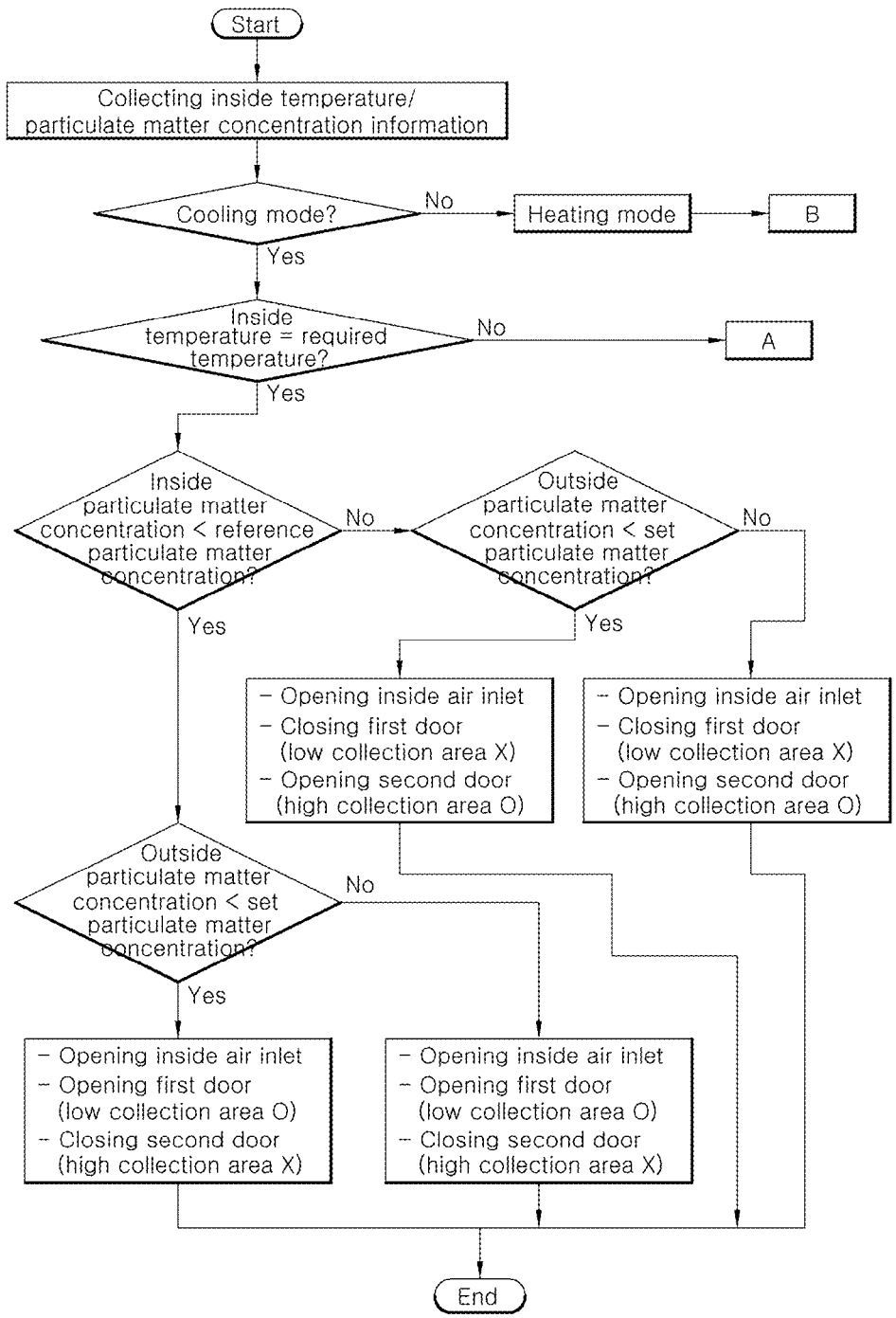
FIGS. 3-6 are control flowcharts of the air conditioning system having a hybrid filter according to the present disclosure.
Figure 4:
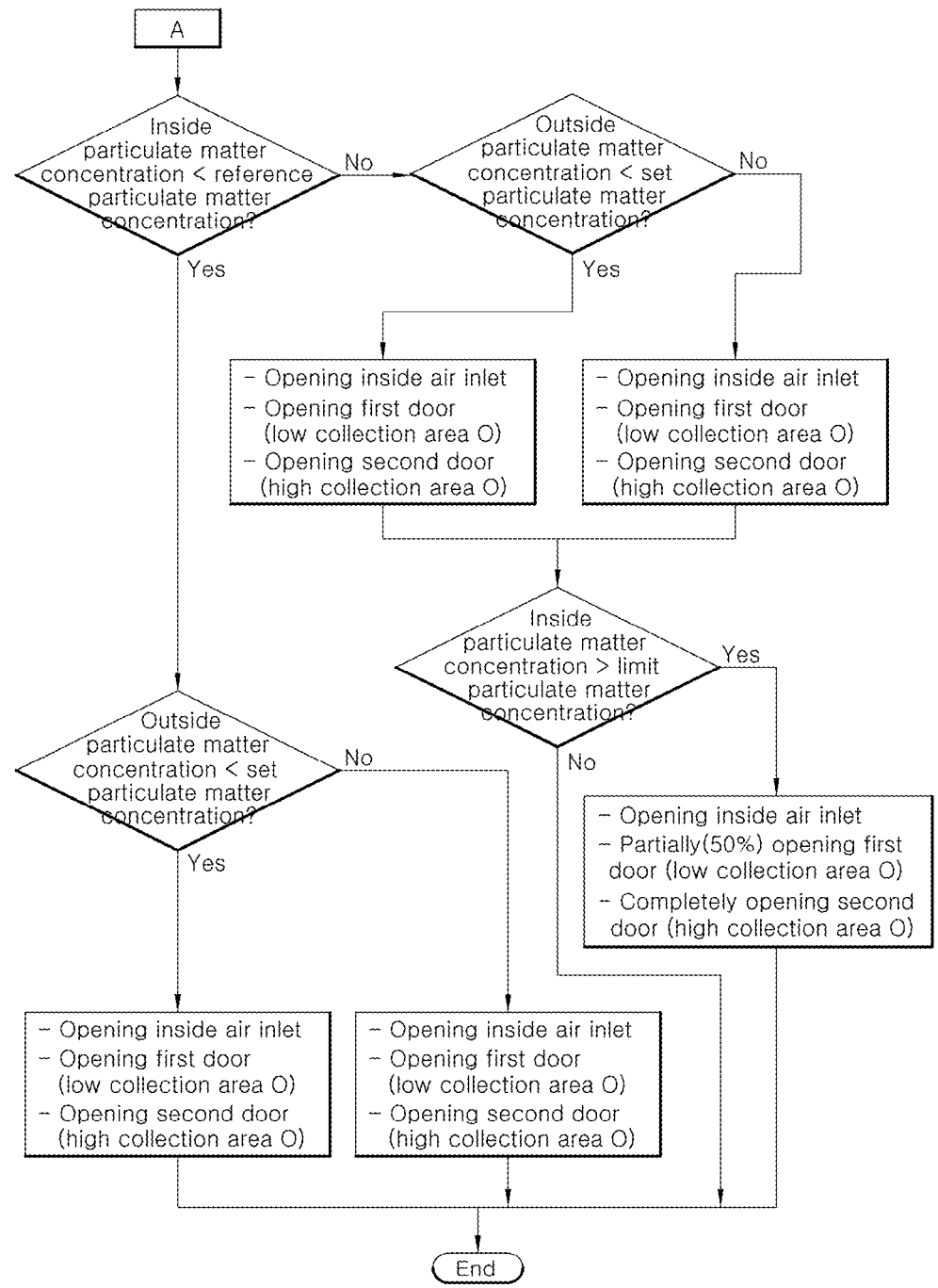
Figure 5:
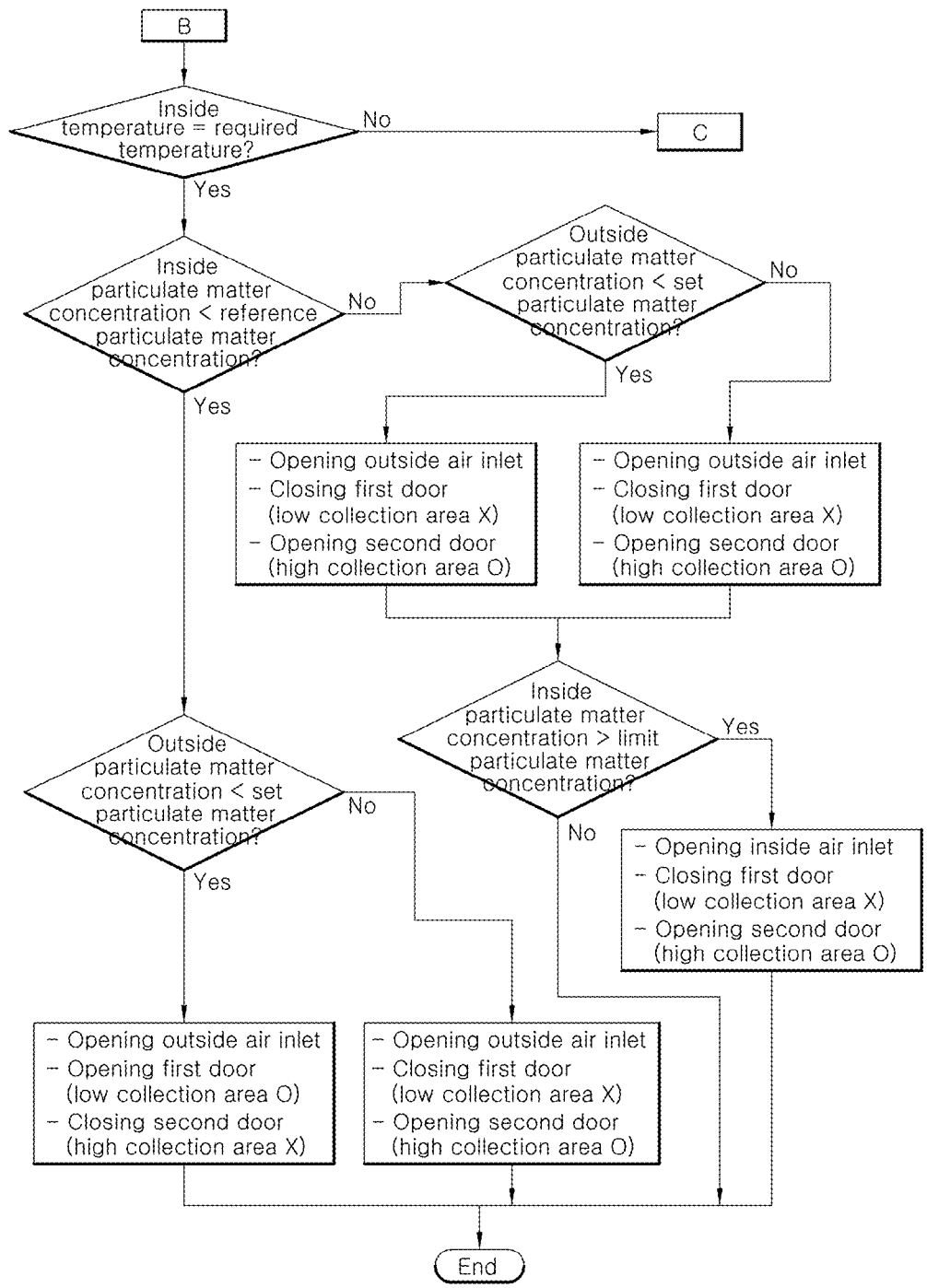
Figure 6:
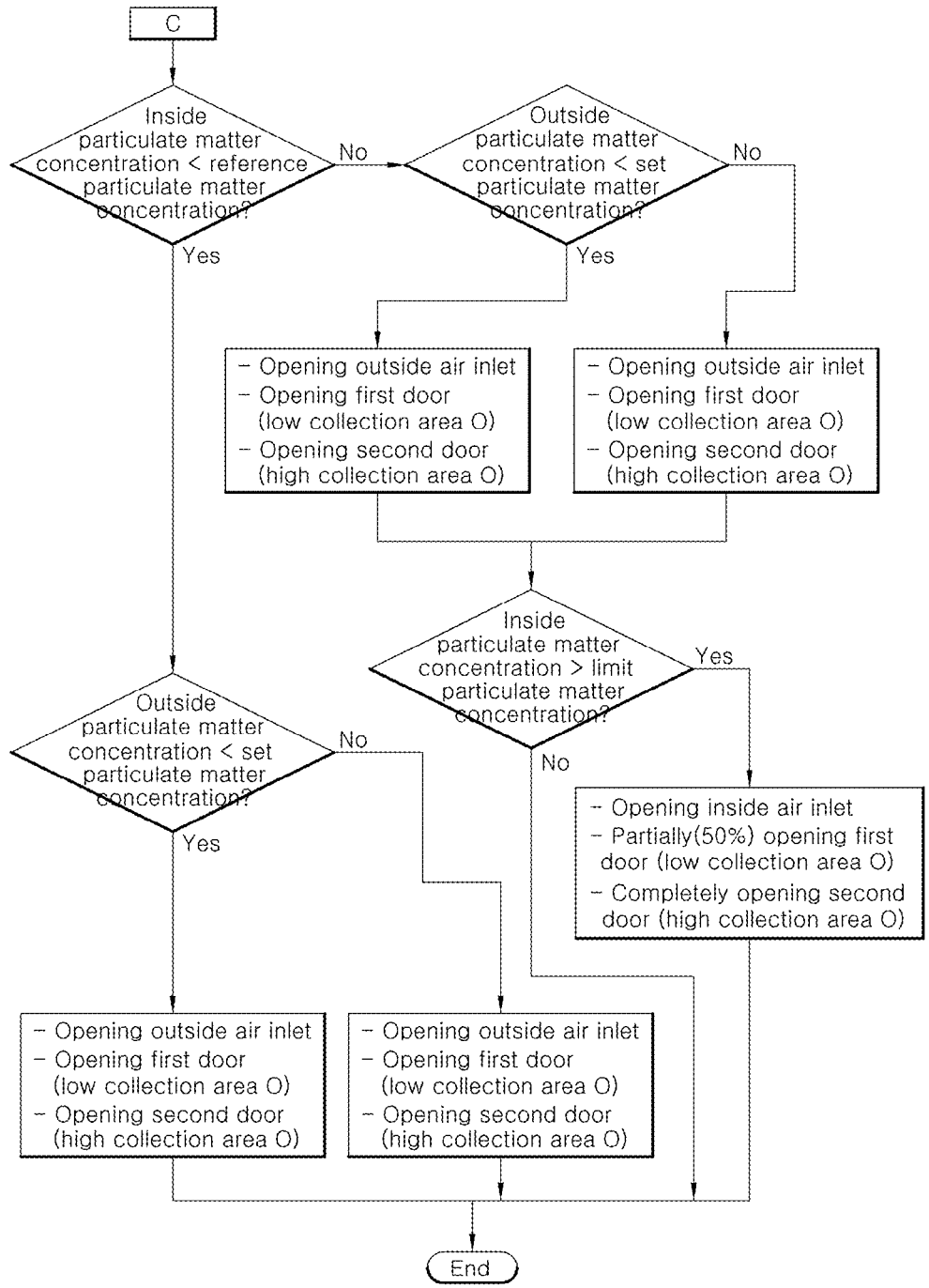

FIG. 1 is a view illustrating the air conditioning system having a hybrid filter according to the present disclosure. FIG. 2 is a view illustrating the configuration of the air conditioning system having a hybrid filter illustrated in FIG. 1. FIGS. 3-6 are control flowcharts of the air conditioning system having a hybrid filter according to the present disclosure.

The air conditioning system 100 includes a blower 40, a heater 50, a cooler 60, and an air conditioning housing 10. Air is blown by the operation of the blower 40 and flows through the air conditioning housing 10. The air then flows through the heater 50 or the cooler 60, and the temperature is controlled. To this end, a temperature control door may further be provided in the air conditioning system 100.

According to the present disclosure, the cleaning of air-conditioned air is performed by applying an air filter 20 to an inner part of the air conditioning housing 10.

As illustrated in FIGS. 1 and 2, the air conditioning system has the hybrid filter according to the present disclosure. The system includes the air conditioning housing 10, which has an outside air inlet 11 through which outside air flows, an inside air inlet 12 through which inside air flows, and an inside/outside air door 13 that controls opening ratios of the outside air inlet 11 and the inside air inlet 12. The air conditioning system also includes the air filter 20, which is provided to filter foreign materials from the air flowing through the outside air inlet 11 and the inside air inlet 12 in the air conditioning housing 10. The air filter 20 is divided into a low collection area 21 and a high collection area 22. The air conditioning system further includes a filter door 30 arranged between the outside air inlet 11 and the inside air inlet 12 and the air filter 20. The filter door controls a flow amount of the air flowing through the low collection area 21 and the high collection area 22 of the air filter 20.

Accordingly, the air conditioning housing 10 includes the outside air inlet 11, the inside air inlet 12, and the inside/outside air door 13 formed in a fan-shaped dome. The inside/outside air door opens and closes the outside air inlet or the inside air inlet 12. A rotation angle of the inside/outside air door 13 may be controlled by a motor operation, and a cam structure may be provided for the rotation operation of the inside/outside air door 13.

The air filter 20 filters foreign materials from air that is introduced through the outside air inlet 11 and the inside air inlet 12. The air filter 20 is provided inside the air conditioning housing 10 and is configured to be divided into the low collection area 21 and the high collection area 22. As for the air filter 20, the high collection area 22 is configured to have a foreign material collection rate that is higher than the low collection area 21. Accordingly, the high collection area 22 may be configured as a high efficiency particulate air (HEPA) filter, and the low collection area 21 may be configured as a normal filter. However, as for the high collection area 22 having a high foreign material collection rate, the performance of filtering foreign materials such as particulate matter is relatively high. However, the high collection area 22 may have low durability and low air flow efficiency compared to the low collection area 21 having a low foreign material collection rate.

Accordingly, according to the present disclosure, the filter door 30 controls the flow amount of air flowing through the low collection area 21 and the high collection area 22 of the air filter 20. The filter door 30 is provided to maintain the durability and air filtration performance of the air filter 20.

Air flowing through the air filter 20 is selectively directed to the low collection area 21 or the high collection area 22 via the filter door 30. Accordingly, when air cleaning is required, air flows through the high collection area 22. When normal air conditioning is required, air flows through the low collection area 21. When high air conditioning is required, air may flow through the high collection area 22 and the low collection area 21. Accordingly, the air conditioning system of the present disclosure provides the air-conditioned air to the inside of a vehicle and performs the air cleaning function, thereby keeping the inside air pleasant.

To this end, the filter door 30 is described in detail. As illustrated in FIG. 1, the filter door 30 may include a first door 31 disposed to correspond to the low collection area 21 and may be configured to control the flow amount of air flowing to the low collection area 21. The filter door 30 may also include a second door 32 disposed to correspond to the high collection area 22 and may be configured to control the flow amount of air flowing to the high collection area 22.

Accordingly, the filter door 30 includes the first door 31 and the second door 32 corresponding to the low collection area 21 and the high collection area 22, respectively. Accordingly, the air flowing through the outside air inlet 11 and the inside air inlet 12 of the air conditioning housing 10 may selectively flow to the low collection area 21 or the high collection area 22 of the air filter 20, depending on the opening ratios of the first door 31 and the second door 32.

The first door 31 and the second door 32 are each composed of a plurality of flaps 33 arranged linearly between the outside air inlet 11 and the inside air inlet 12 and the air filter 20. A rotation angle of each of the plurality of flaps, i.e., the flaps 33, corresponding to the first door 31 and the flaps 33 corresponding to the second door 32 is changed by the operation of an actuator not shown. The flow amount of the air flowing to the air filter 20 can thereby be controlled.

More specifically, the first door 31 includes a plurality of first flaps 33a and the second door 32 includes a plurality of second flaps 33b. The first flaps 33a and the second flaps 33b are linearly arranged between the outside air inlet 11 and the inside air inlet 12 and the air filter 20. The first flaps 33a and the second flaps 33b can be rotated by driving the actuator. The connection structures of the first flaps 33a and the second flaps 33b, rotated by the operation of the actuator, may have various connection structures such as a cam connection structure, a gear connection structure, a rack and pinion connection structure, and the like. Accordingly, the rotation angles of the first flaps 33a and the second flaps 33b can be controlled.

The rotation angles of the first door 31, the second door 32, and the inside/outside air door 13, which are described above, may be controlled to be changed by control of a controller 70. Hereinbelow, the control of the opening ratios of the first door 31, the second door 32, and the inside/outside air door 13 by the control of the controller 70 is described in detail with reference to FIGS. 3-6.

The air conditioning system of the present disclosure further includes the controller 70. The controller 70 performs the control of opening and closing the inside/outside air door 13 and the control of the first door 31 and the second door 32 of the filter door 30 by selecting a cooling or heating mode. The cooling or heating mode is selected according to an inside temperature and to an inside/outside particulate matter concentration after collecting the inside temperature and information on the inside/outside particulate matter concentration.

The controller 70 may receive inside and outside temperature information via a temperature sensor provided in a vehicle and may collect information on particulate matter concentration via a particulate matter sensor. Furthermore, the temperature required by a driver, i.e., the required temperature, may be set in the controller 70 and may be a value set initially. In other words, the controller 70 performs the heating mode when the inside temperature is lower than the required temperature and performs the cooling mode when the inside temperature is higher than the required temperature. Furthermore, the controller 70 may allow the inside temperature to quickly achieve or reach the required temperature by increasing the level or operation speed of the blower when the inside temperature does not reach the required temperature.

In addition, in the controller 70, a reference particulate matter concentration, a set particulate matter concentration, and a limit particulate matter concentration may be preset to determine the particulate matter concentration. In an example, when the inside/outside particulate matter concentration is lower than the reference particulate matter concentration or the set particulate matter concentration, the particulate matter concentration may be determined to be in a low state. When the particulate matter concentration is higher than the reference particulate matter concentration or the set particulate matter concentration, the particulate matter concentration may be determined to be in a high state. When the particulate matter concentration is higher than the limit particulate matter concentration, the particulate matter concentration may be determined to be in a very high state.

Such a controller 70 is described in detail below. When the inside temperature reaches the required temperature and the inside particulate matter concentration is lower than the reference particulate matter concentration, the controller 70 in the cooling mode can perform control of allowing the inside/outside air door 13 to open the inside air inlet 12, of opening the first door 31, and of closing the second door 32.

Accordingly, in the cooling mode, the controller 70 allows the inside/outside air door 13 to open the inside air inlet 12 so as to perform an inside air mode, so that efficient cooling of air-conditioned air is performed. When the inside temperature reaches the required temperature and the inside particulate matter concentration is lower than the reference particulate matter concentration, the controller 70 controls the first door 31 and the second door 32 such that the first door 31 is opened and the second door 32 is closed. The inside air thus flows through the low collection area 21 of the air filter 20.

In other words, since the inside temperature reaches the required temperature, the flow amount of air is not required to be substantial. Also, since the inside particulate matter concentration is lower than the reference particulate matter concentration in the situation of the circulation of the inside air, the inside air flows only through the low collection area 21 of the air filter 20. Thus, the durability of the high collection area 22 is secured.

In this case, the inside air is circulated although the outside particulate matter concentration is higher than the set particulate matter concentration. Thus, the controller 70 can perform the same control.

In another example, when the inside temperature reaches the required temperature and the inside particulate matter concentration is higher than the reference particulate matter concentration, the controller 70 in the cooling mode can perform control of allowing the inside/outside air door 13 to open the inside air inlet, of closing the first door 31, and of opening the second door 32.

Accordingly, in the cooling mode, the controller 70 allows the inside/outside air door 13 to open the inside air inlet 12. When the inside temperature reaches the required temperature and the inside particulate matter concentration is higher than the reference particulate matter concentration, the controller 70 controls the first door 31 and the second door 32 such that the first door 31 is closed and the second door 32 is opened. The inside air thus flows through the high collection area 22 of the air filter 20.

In other words, since the inside temperature reaches the required temperature, the flow amount of air is not required to be substantial. Also, when the inside particulate matter concentration is higher than the reference particulate matter concentration in the situation of the circulation of the inside air, the inside air is allowed to flow only through the high collection area 22 of the air filter 20. An air purification rate is thus improved.

In this case, the inside air is circulated although the outside particulate matter concentration is higher than the set particulate matter concentration. Thus, the same control can be performed as the inside air is purified by flowing through the high collection area 22 of the air filter 20.

In another example, when the inside temperature does not reach the required temperature and the inside particulate matter concentration is lower than the reference particulate matter concentration in the cooling mode, the controller 70 in the cooling mode can perform control of allowing the inside/outside air door 13 to open the inside air inlet 12 and of opening the first door 31 and the second door 32.

Accordingly, in the cooling mode, the controller 70 allows the inside/outside air door 13 to open the inside air inlet 12. When the inside temperature does not reach the required temperature and the inside particulate matter concentration is lower than the reference particulate matter concentration, the controller 70 performs control of opening the first door 31 and the second door 32. Air thus flows through the low collection area 21 and the high collection area 22 of the air filter 20.

In other words, when the inside temperature does not reach the required temperature, the flow amount of air is required to be secured so that the inside temperature reaches the required temperature. Accordingly, the controller 70 allows air to flow through the high collection area 22 and the low collection area 21 of the air filter 20 by opening the first door 31 and the second door 32.

In this case, the inside air flows through the low collection area 21 and the high collection area 22 of the air filter 20 while circulating and is purified although the outside particulate matter concentration is higher than the set particulate matter concentration. Thus, the same control can be performed.

In another example, when the inside temperature does not reach the required temperature and the inside particulate matter concentration is higher than the reference particulate matter concentration, the controller 70 in the cooling mode can perform the control of allowing the inside/outside air door 13 to open the inside air inlet 12 and of opening the first door 31 and the second door 32.

Accordingly, in the cooling mode, the controller 70 allows the inside/outside air door 13 to open the inside air inlet 12. When the inside temperature does not reach the required temperature and the inside particulate matter concentration is higher than the reference particulate matter concentration, the controller 70 performs the control of opening the first door 31 and the second door 32. Thus, air flows through the low collection area 21 and the high collection area 22 of the air filter 20.

In other words, when the inside temperature does not reach the required temperature, the flow amount of air is required to be secured so that the inside temperature reaches the required temperature. Accordingly, the controller 70 allows air to flow through the high collection area 22 and the low collection area 21 of the air filter 20 by opening the first door 31 and the second door 32. Furthermore, as the air flows through the low collection area 21 and the high collection area 22 of the air filter 20, the air purification rate is improved.

In this case, the inside air flows through the low collection area 21 and the high collection area 22 of the air filter 20 while circulating and is purified although the outside particulate matter concentration is higher than the set particulate matter concentration. Thus, the same control can be performed.

In another example, when the inside particulate matter concentration is higher than the limit particulate matter concentration that is set to be higher than the reference particulate matter concentration, the controller 70 can perform control of partially opening the first door 31 and completely opening the second door 32. In other words, when the inside particulate matter concentration is higher than the limit particulate matter concentration, air purification is required. Accordingly, the controller 70 allows the flow amount of air flowing through the high collection area 22 of the air filter 20 to be increased by partially opening the first door 31 and by completely opening the second door 32, so that the air purification rate is improved. Furthermore, since the inside temperature does not reach the required temperature, the flow amount of air for temperature control is secured by air flowing through the low collection area 21 and the high collection area 22 of the air filter 20.

In another example, when the inside temperature reaches the required temperature and the outside particulate matter concentration is lower than the set particulate matter concentration, the controller 70 in the heating mode can perform control of allowing the inside/outside air door 13 to open the outside air inlet 11, of opening the first door 31, and of closing the second door 32.

Accordingly, in the heating mode, the controller 70 allows an outside air circulation mode to be performed by allowing the inside/outside air door 13 to open the outside air inlet 11, thereby minimizing the generation of moisture on the vehicle glass surfaces. When the inside temperature reaches the required temperature and the outside particulate matter concentration is lower than the set particulate matter concentration, the controller 70 allows the outside air to flow through the low collection area 21 of the air filter 20 by performing control of opening the first door 31 and closing the second door 32.

In other words, the inside temperature reaches the required temperature, the flow amount of air is not required to be substantial, and the outside particulate matter concentration is lower than the set particulate matter concentration despite the circulation of the outside air. Thus, air flows only through the low collection area 21 of the air filter 20, so the durability of the high collection area 22 is secured.

In another example, when the inside temperature reaches the required temperature and the outside particulate matter concentration is higher than the set particulate matter concentration, the controller 70 in the heating mode can perform control of allowing the inside/outside air door 13 to open the outside air inlet 11, of closing the first door 31, and of opening the second door 32.

Accordingly, in the heating mode, the controller 70 allows the inside/outside air door 13 to open the outside air inlet 11. When the inside temperature reaches the required temperature and the outside particulate matter concentration is higher than the set particulate matter concentration, the controller 70 performs control of closing the first door 31 and opening the second door 32. The outside air thus flows through the high collection area 22 of the air filter 20.

In other words, the inside temperature reaches the required temperature, the flow amount of air is not required to be substantial, and the outside air flows only through the high collection area 22 of the air filter 20. The air purification rate is thus improved.

In another example, when the inside temperature reaches the required temperature, the inside particulate matter concentration is higher than the reference particulate matter concentration, and the outside particulate matter concentration is lower than the set particulate matter concentration, the controller 70 in the heating mode can perform the control of allowing the inside/outside air door 13 to open the outside air inlet 11, of closing the first door 31, and of opening the second door 32.

Accordingly, in the heating mode, the controller 70 allows the inside/outside air door 13 to open the outside air inlet 11. When the inside temperature reaches the required temperature, the inside particulate matter concentration is higher than the reference particulate matter concentration, and the outside particulate matter concentration is lower than the set particulate matter concentration, the controller 70 performs the control of closing the first door 31 and opening the second door 32. Thus, air flows through the high collection area 22 of the air filter 20.

In other words, the inside temperature reaches the required temperature, the flow amount of air is not required to be substantial, and the outside air flows only through the high collection area 22 of the air filter 20. Thus, purified air is circulated inside the vehicle and the inside air is purified.

In this case, the outside air is purified by flowing through the high collection area 22 of the air filter 20 although the outside particulate matter concentration is higher than the set particulate matter concentration. Thus, the same control can be performed.

In another example, when the inside particulate matter concentration is higher than the limit particulate matter concentration that is set to be higher than the reference particulate matter concentration, the controller 70 can perform the control of allowing the inside/outside air door 13 to open the inside air inlet 12, of closing the first door 31 and of opening the second door 32.

In other words, when the inside particulate matter concentration is higher than the limit particulate matter concentration, prompt air purification is required. Accordingly, the controller allows the inside/outside air door 13 to open the inside air inlet 12, allows the first door 31 to be closed, and allows the second door 32 to be opened. Accordingly, as the inside air flows through the high collection area 22 of the air filter 20, the air purification rate is increased. Accordingly, when the inside particulate matter concentration is higher than the limit particulate matter concentration, the controller 70, even in the heating mode, allows the inside air to be circulated. The circulated inside air is thus purified by flowing through the high collection area 22 of the air filter 20. Accordingly, the inside air is quickly purified.

In another example, when the inside temperature does not reach the required temperature and the outside particulate matter concentration is higher than the set particulate matter concentration, the controller 70 in the heating mode can perform the control of allowing the inside/outside air door 13 to open the outside air inlet 11 and of opening the first door 31 and the second door 32.

Accordingly, in the heating mode, the controller 70 allows the inside/outside air door 13 to open the outside air inlet 11. When the inside temperature does not reach the required temperature and the outside particulate matter concentration is higher than the set particulate matter concentration, the controller 70 performs the control of allowing the first door 31 and the second door 32 to be opened. Thus, air flows through the low collection area 21 and the high collection area 22 of the air filter 20.

In other words, when the inside temperature does not reach the required temperature, the flow amount of air is required to be secured so that the inside temperature reaches the required temperature. Accordingly, the controller 70 allows air to flow through the high collection area 22 and the low collection area 21 of the air filter 20 by opening the first door 31 and the second door 32. Furthermore, as the outside air flows through the low collection area 21 and the high collection area 22 of the air filter 20, purified air can be provided to the inside.

In another example, when the inside temperature does not reach the required temperature, the inside particulate matter concentration is higher than the reference particulate matter concentration, and the outside particulate matter concentration is lower than the set particulate matter concentration, the controller 70 in the heating mode can perform control of allowing the inside/outside air door 13 to open the outside air inlet 11 and of opening the first door 31 and the second door 32.

Accordingly, in the heating mode, the controller 70 allows the inside/outside air door 13 to open the outside air inlet 11. When the inside temperature does not reach the required temperature, the inside particulate matter concentration is higher than the reference particulate matter concentration, and the outside particulate matter concentration is lower than the set particulate matter concentration, the controller 70 performs the control of opening the first door 31 and the second door 32. Thus, air flows through the low collection area 21 and the high collection area 22 of the air filter 20.

In other words, when the inside temperature does not reach the required temperature, the flow amount of air is required to be secured so that the inside temperature reaches the required temperature. Accordingly, the controller 70 allows the air to flow through the high collection area 22 and the low collection area 21 of the air filter 20 by opening the first door 31 and the second door 32. Furthermore, as the outside air flows through the low collection area 21 and the high collection area 22 of the air filter 20, the purified outside air is circulated to the inside. Accordingly, the inside air is purified.

In this case, the outside air is purified by flowing through the low collection area 21 and the high collection area 22 of the air filter 20 although the outside particulate matter concentration is higher than the set particulate matter concentration. Thus, the same control can be performed.

In another example, when the inside particulate matter concentration is higher than the limit particulate matter concentration that is set to be higher than the reference particulate matter concentration, the controller 70 can perform the control of allowing the inside/outside air door 13 to open the inside air inlet 12, of partially opening the first door 31, and of completely opening the second door 32.

In other words, when the inside particulate matter concentration is higher than the limit particulate matter concentration, prompt air purification is required. The controller 70 allows the inside air to be circulated by allowing the inside/outside air door 13 to open the inside air inlet 12, allows the first door 31 to be partially opened, and allows the second door 32 to be completely opened. Thus, the flow amount of air flowing through the high collection area 22 of the air filter 20 is increased and the air purification rate is improved. In addition, the flow amount of air is secured by air flowing through the low collection area 21 and the high collection area 22 of the air filter 20 since the inside temperature does not reach the required temperature. Thus, the inside temperature can quickly achieve or reach the required temperature.

The disclosed air conditioning system has a hybrid filter, which has the above-described structure, provides inside air conditioning, and performs the air cleaning function of inside air, thereby keeping the inside air pleasant. In addition, air-conditioned air is efficiently circulated according to the cooling and heating conditions of the inside air and the air cleaning time of the inside air is shortened, thereby reducing the possibility of moisture generated on the inside window surfaces during air cleaning.

Although the embodiment of the present disclosure has been described for illustrative purposes, those having ordinary skill in the art will appreciate that various modifications, additions, and substitutions are possible, without departing from the scope and spirit of the disclosure as set forth in the accompanying claims.

What is claimed is:

1. An air conditioning system having a hybrid filter, the system comprising:
   an air conditioning housing having an outside air inlet through which outside air flows, an inside air inlet through which inside air flows, and an inside/outside air door configured to control opening ratios of the outside air inlet and the inside air inlet;
   an air filter provided to filter foreign materials from the outside air flowing through the outside air inlet and the inside air flowing through the inside air inlet in the air conditioning housing, the air filter being divided into a low collection area and a high collection area; and
   a filter door arranged downstream of the outside air inlet, downstream of the inside air inlet and upstream of the air filter, the filter door controlling a flow amount of air flowing through the low collection area and a flow amount of air flowing through the high collection area of the air filter.

2. The system of claim 1, wherein the air filter is configured such that a foreign material collection rate of the high collection area is higher than a foreign material collection rate of the low collection area.

3. The system of claim 1, wherein the filter door comprises:
   a first door disposed to correspond to the low collection area and configured to control the flow amount of air flowing to the low collection area; and
   a second door disposed to correspond to the high collection area and configured to control the flow amount of air flowing to the high collection area.

4. The system of claim 3, wherein the first door and the second door are each composed of a plurality of flaps, wherein a rotation angle of each of the plurality of flaps corresponding to the first door and the plurality of flaps corresponding to the second door is configured to change so that the flow amount of air through the low collection area and the flow amount of air flowing through the high collection area of the air filter are adjustable.

5. The system of claim 3, further comprising:
   a controller performing control of opening and closing the inside/outside air door and the first door and the second door of the filter door by selecting a cooling or heating mode according to an inside temperature and at least one of an inside particulate matter concentration and an outside particulate matter concentration after collecting the inside temperature and information on the at least one of the inside particulate matter concentration and the outside particulate matter concentration.

6. The system of claim 5, wherein, when the inside temperature reaches a required temperature and the inside particulate matter concentration is lower than a reference particulate matter concentration, the controller in the cooling mode performs control of allowing the inside/outside air door to open the inside air inlet, of opening the first door, and of closing the second door.

7. The system of claim 5, wherein, when the inside temperature reaches a required temperature and the inside particulate matter concentration is higher than a reference particulate matter concentration, the controller in the cooling mode performs control of allowing the inside/outside air door to open the inside air inlet, of closing the first door, and of opening the second door.

8. The system of claim 5, wherein, when the inside temperature does not reach a required temperature and the inside particulate matter concentration is lower than a reference particulate matter concentration, the controller in the cooling mode performs control of allowing the inside/outside air door to open the inside air inlet and of opening the first door and the second door.

9. The system of claim 5, wherein, when the inside temperature does not reach a required temperature and the inside particulate matter concentration is higher than a reference particulate matter concentration, the controller in the cooling mode performs control of allowing the inside/outside air door to open the inside air inlet and of opening the first door and the second door.

10. The system of claim 9, wherein, when the inside particulate matter concentration is higher than a limit particulate matter concentration that is set to be higher than the reference particulate matter concentration, the controller performs control of partially opening the first door and completely opening the second door.

11. The system of claim 5, wherein, when the inside temperature reaches a required temperature and the outside particulate matter concentration is lower than a set particulate matter concentration, the controller in the heating mode performs control of allowing the inside/outside air door to open the outside air inlet, of opening the first door, and of closing the second door.

12. The system of claim 5, wherein, when the inside temperature reaches a required temperature and the outside particulate matter concentration is higher than a set particulate matter concentration, the controller in the heating mode performs control of allowing the inside/outside air door to open the outside air inlet, of closing the first door, and of opening the second door.

13. The system of claim 5, wherein, when the inside temperature reaches a required temperature, the inside particulate matter concentration is higher than a reference particulate matter concentration, and the outside particulate matter concentration is lower than a set particulate matter concentration, the controller in the heating mode performs control of allowing the inside/outside air door to open the outside air inlet, of closing the first door, and of opening the second door.

14. The system of claim 13, wherein, when the inside particulate matter concentration is higher than a limit particulate matter concentration that is set to be higher than the reference particulate matter concentration, the controller performs the control of allowing the inside/outside air door to open the inside air inlet, of closing the first door, and of opening the second door.

15. The system of claim 5, wherein, when the inside temperature does not reach a required temperature and the outside particulate matter concentration is higher than a set particulate matter concentration, the controller in the heating mode performs control of allowing the inside/outside air door to open the outside air inlet and of opening the first door and the second door.

16. The system of claim 5, wherein, when the inside temperature does not reach a required temperature, the inside particulate matter concentration is higher than a reference particulate matter concentration, and the outside particulate matter concentration is lower than a set particulate matter concentration, the controller in the heating mode performs control of allowing the inside/outside air door to open the outside air inlet and of opening the first door and the second door.

17. The system of claim 16, wherein, when the inside particulate matter concentration is higher than a limit particulate matter concentration that is set to be higher than the reference particulate matter concentration, the controller performs the control of allowing the inside/outside air door to open the inside air inlet, of partially opening the first door, and of completely opening the second door.

* * * * *